Figure 1:
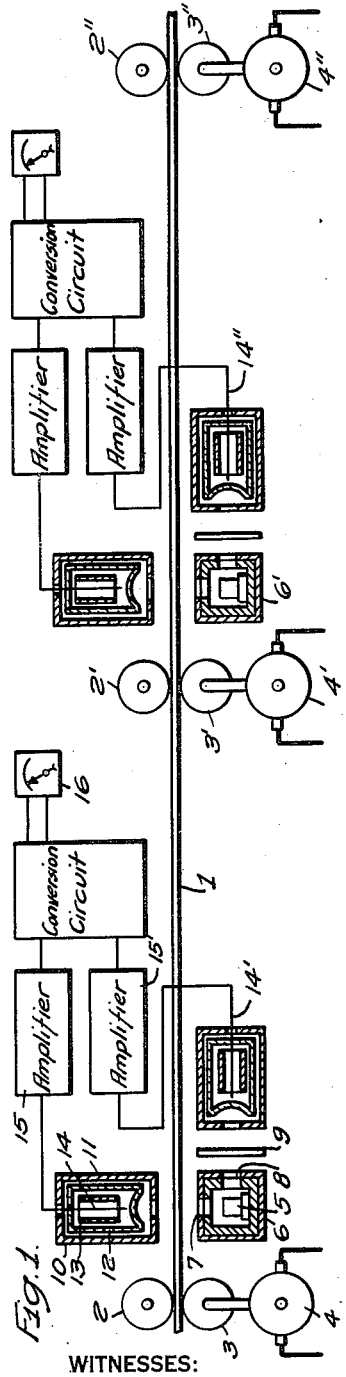

Dec. 2, 1941. W. E. SHOUPP ET AL 2,264,725
THICKNESS GAUGE FOR ROLLING MILLS
Filed Aug. 2, 1940

WITNESSES:
E. A. M'Closkey.
F. S. Bartholy

INVENTORS
William E. Shoupp and
Leonid M. Tichvinsky.
BY
F. W. Syle.
ATTORNEY

Patented Dec. 2, 1941

2,264,725

UNITED STATES PATENT OFFICE 2,264,725

THICKNESS GAUGE FOR ROLLING MILLS

William E. Shoupp and Leonid M. Tichvinsky, Pittsburgh, Pa., assignors to Westinghouse Electric & Manufacturing Company, East Pittsburgh, Pa., a corporation of Pennsylvania Application August 2, 1940, Serial No. 349,952

11 Claims. (Cl. 250—83.6)

This invention relates to measuring and indicating apparatus and has particular relation to apparatus for measuring the thickness of sheet metal while passing through a rolling mill.

Sheet metal such as is used in the canning industry is prepared by passing slabs of progressively decreasing thickness through a series of rolls. The user of the sheet metal for whom it is rolled generally specifies that it shall have a certain thickness. To attain the desired thickness, the rolls must be properly adjusted. In the past, the adjustment has been carried out primarily by trial and error. A number of trial slabs are first passed through the rolls and the thickness of the resultant sheet is measured. Adjustments are made in the position of the rolls until the desired thickness is attained. The trial sheet is, of course, in general, useless and is customarily re-melted. The trial and error process is, therefore, wasteful and expensive.

On rare occasions gauges of various types are used. However, the gauges are expensive and are disposed near the surface of the sheet. When the sheet breaks, as often happens, the gauges are destroyed. Moreover, the vibrations arising from the noise in the region of the rolls materially affects the operation of the gauges.

It is accordingly an object of our invention to provide apparatus for indicating the thickness of sheet-stock as it passes through the rolls.

Another object of this invention is to provide apparatus aiding in the rolling of sheets by eliminating trial runs heretofore necessary in determining the desired thickness.

A general object of this invention is to provide apparatus of simple structure for determining any dimension of a material.

A more specific object of the invention is to provide a method for measuring the thickness of sheet metal as it passes from roll to roll.

Another specific object of the invention is to provide a rugged device for measuring the thickness of the sheet in a rolling mill.

More concisely stated, it is an object of this invention to eliminate the waste of power and material incident to the determination of the thickness of sheet metal produced in a rolling mill.

The invention arises from the realization that the extent of the absorption of beta particles by a material can be utilized as an index in determining its thickness. In accordance with the invention, therefore, the corpuscular radiation from a radio-active substance relatively rich in beta particles is projected through the material, the thickness of which is to be measured and the absorption of the beta particles noted by the rate of impulses caused by non-absorbed particles. In the case of the sheet metal, a source of radio-active material is disposed adjacent each of the sets of rolls and the thickness of the sheet at each set is measured by observing the absorption of the beta particles.

Radio-active material, in general, emits not only beta particles but also positively charged electrons (positrons), alpha particles and gamma rays. The alpha particles are positively charged helium nuclei and the gamma rays are short-wave length X-rays, that is electromagnetic radiation. The beta particles are negatively charged electrons traveling at great speed.

This invention, in its most general aspects, contemplates the use of radio-active radiation of any type. In its more limited aspects, the invention contemplates the use of either beta rays or high-speed positive electrons or both. In the preferred practice of the invention, the absorption only as to the positive and negative electrons is measured since it yields the most accurate results. To determine the energy of the beta rays, a measuring device involving ionization of one type or another is used. Since alpha and gamma rays produce ionization as well as beta rays, one of the problems incident to this invention is the elimination of the vitiating effect produced by the former. In this connection, the alpha rays do not offer serious difficulties. However, the gamma rays being more penetrating than beta rays cannot, with facility, be filtered out. Moreover, the radiation is over an extensive volume and any filtering which may be introduced is largely ineffective. Finally, gamma rays have a tendency to produce severe and often incurable burns and the operator of the apparatus is, therefore, endangered.

It is an aspect of this invention in its more restricted sense, therefore, to eliminate the gamma rays in the provision of the apparatus. In this connection, radio-active materials have extensively been investigated and it was found that there are a number of substances which are weak in the undesired rays and may be used with advantage in the practice of the invention. An example of a material of this type is radio active phosphorus and in the preferred practice of this invention, this material is used.

It is to be noted, however that the use of phosphorus or other materials poor in gamma rays in itself gives rise to a serious problem. The materials poor in gamma rays may decay rapidly and therefore the radiation emitted thereby decreases substantially with time. While the material may be replaced with facility, the decay of the material does give rise to a serious problem. The decreasing radiation constitutes a decrease in the beta particle energy incident on the sheet and, therefore, results in the indication of the beta particle energy transmitted through the material. To solve the problem arising in this connection, there is provided a plate of standard thickness adjacent to each of the sources of the radiation and the absorption of the standard plate is balanced continually against the absorption of the material under consideration.

While the invention is peculiarly adaptable for the measurement of the thickness of hot or cold rolled sheet metal it may be used extensively for measuring thickness of other materials. For example, it may be used for the measurement of the thickness of rubber, paper, or other similar material either at rest or while passing over a series of rolls during the course of a manufacturing process. The invention may also be used in the measurement of the thickness of castings of any general type, such as aluminum tubular castings.

Figure 2:
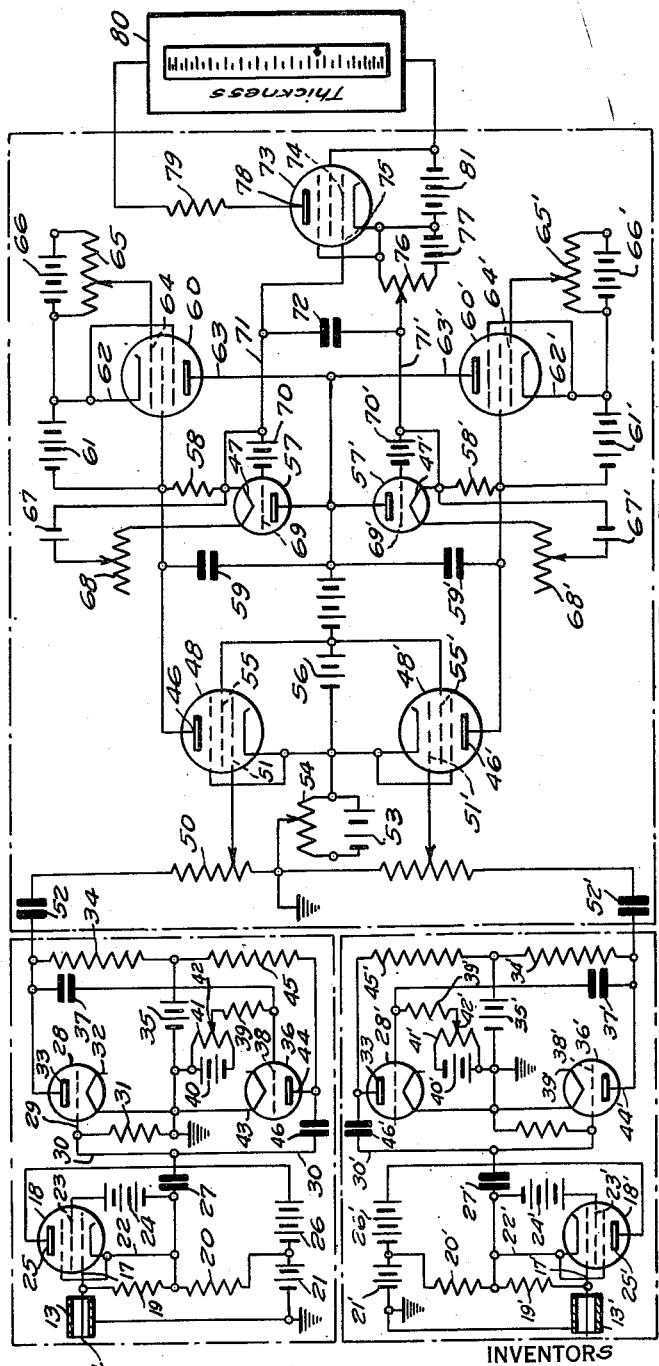

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a diagrammatic view showing a preferred embodiment of our invention; and Fig. 2 is a diagrammatic view showing a circuit used in the practice of our invention.

Referring to Fig. 1, the thickness indicating apparatus is shown, by way of example, as being applied to a sheet material in the process of rolling. The material may be of different types of metals or a nonmetallic substance, as long as it has the property of absorbing a certain amount of beta-particles. The sheet stock 1 is forced through a series of rollers 2, 3, 2', 3', 2'', 3'' which may be driven by motors 4, 4' and 4''. Each set of rollers is placed at a closer distance in order to reduce the thickness of the material in successive steps.

The problem confronting the operator of such rolling mills was mentioned in the preamble. It may be added that it is important also that the operator be able to observe the effect of each set of rollers upon the material, while it passes through them at comparatively high speed. For this reason the thickness indicator in accordance with this invention is shown in duplicate in this figure, in order that an indication may be obtained at a point past each set of rollers. However, in describing the apparatus, it will be sufficient to refer to only one set thereof, the others being exactly the same, performing the same function.

The radio-active material 5 is placed in a well shielded metallic container 6 which may have a layer of lead and a layer of steel. There are two openings provided in this container, one in a vertical direction, and the other in a horizontal direction to concentrate the radiation into two separate beams. The one emanating from the opening 7 is directed to pass through the material 1 in a transverse direction to its thickness whereas the other beam emanating from the opening 8 is directed to pass through a standard material 9 of the predetermined thickness. The radiation to which the sheet stock 1 is subjected will lose a certain number of electron particles which are directly proportional to the thickness of the material and its absorbing properties to beta-rays. The beta-particles which were not absorbed and penetrated the material 1 are arranged to pass through the opening of a collector 10 which is disposed perpendicularly above the sheet stock at a point where the other side thereof is subjected to radiation. This collector may take the form of a device known in the art as a Geiger counter or similar apparatus based on the ionization property of electrons, such, for example, as an ionization chamber. By way of example, a Geiger counter is shown comprising a metallic housing 11 in which there is a glass cylinder 12 having relatively thick walls except for the end wall 13 which faces the opening 14. The end wall 13 is of thin glass through which beta-particles may enter unhindered. Within the glass envelope 12 is an electrode in the form of a metal tube 13 in which there is placed another electrode in the form of a rod 14 properly insulated therefrom. The operation of this device will be explained in detail later, suffice it to say that the electrode 14 is connected through an amplifier 15. The output of this amplifier is connected to a conversion circuit.

The arrangement following the second beam emanating from the radio-active source is exactly a duplicate of the one just described, except that the beta-particles are directed to pass through a standard material 9. The nonabsorbed electrons are collected by another Geiger counter constructed in the same way as the one which receives the beta-particles penetrating the sheet stock. The individual elements of this counter are marked by identical reference characters carrying primary indices. The electrode 14' thereof connects to an amplifier 15', the output of which connects to the conversion circuit wherein the two outputs of amplifiers 15 and 15', respectively, are combined. The conversion circuit feeds into a meter 16 which is calibrated to indicate directly the thickness of the material in whatever units of measurement thereof may be chosen.

Referring to Fig. 2 the amplifiers 15 and 15' and the conversion circuit are shown in detail. Since both these amplifiers are identical as to their circuit constants and elements, only one need be described, and corresponding parts of the other are indicated by the same reference characters to which primary indices are affixed. The electron collectors are schematically indicated showing only the essential elements, namely, the electrodes 13 and 14. Electrode 13 is at ground potential, whereas 14 is connected to the grid electrode 17 of amplifier tube 18 and through grid resistor 19 and anode circuit resistor 20 to a high potential source indicated by the battery 21. The potential of this battery, therefore, is impressed between the electrodes 13 and 14. The cathode 22 of the tube 18 connects to the junction point of resistors 19 and 20. The screen grid 23 is properly maintained at a desired potential by a source indicated by the battery 24. The output circuit of the amplifier includes the anode 25 of the tube 18 which is connected to a source of operating potential shown here by the battery 26, the negative terminal of which connects to the anode load resistance 20.

The various sources of potentials herein mentioned in the form of batteries may, of course, be replaced by suitable power supply devices operated directly from conventional alternating current sources which may be rectified and filtered in accordance with standard practice. Similarly the heating elements of various vacuum tubes have been omitted for the sake of simplicity and clarity in the drawing. Tubes of various types may be used and their filaments can either be heated by raw alternating current if the apparatus is designed for operation from commercial power.

The output of the amplifier tube 18 is coupled to a transmission circuit through the resistor 27 which essentially is another stage, the output characteristic of which will be controlled automatically, as will be described when referring to the operation of the circuit. The transmission circuit includes vacuum tube 28 having grid electrode 29 to which one terminal of condenser 27 is connected by means of conductor 30. The input circuit of the tube 28 comprises a grid resistor 31 between grid electrode 29 and cathode 32. The cathode is also at ground potential. The output circuit of the tube 28 includes in series between anode and cathode the anode 33, a load resistor 34, and anode potential source comprising battery 35. The second tube 36 in the transmission circuit is connected in such manner that the input circuit thereof is energized from the output circuit of tube 28, being coupled thereto by condenser 37 which is connected to the grid 38. The convention elements forming the grid circuit include grid resistor 39, grid bias battery 40 shunted by potentiometer 41. The rider 42 thereof is connected to the grid return terminal of the resistor 39. The circuit is completed in connecting the positive terminal battery to the cathode 43. As can be seen, both cathodes 43 and 42 have ground potentials. The output circuit of the tube 36 includes the anode 44, the load resistance 45 which is supplied from the source 35 in the same manner as tube 28. The output of tube 36 is coupled in a retroactive connection by means of condenser 46, conductor 30 to the grid 29 of tube 28.

The purpose of the transmission network will be explained in connection with the description of the operation of the circuit. The output of each amplifier is fed into a conversion circuit comprising vacuum tubes 48 and 49. The input circuit of tube 48 comprises grid potentiometer 50, the rider of which connects to the grid 51 coupled by means of a condenser to the load resistance 34 or amplifier tube 28. The necessary grid bias for the tube 48 is obtained from the source indicated by the battery 53 shunted by potentiometer 54. The rider of this potentiometer connects to the return terminal of the potentiometer 50 and also to ground. The circuit connection for tube 48' is identical with the one described in connection with tube 48 and identical component elements are marked with similar reference characters bearing primary indices. The screen grids 55 and 55' are supplied with operating potentials from a suitable tap of the battery 56, the highest positive terminal of which connects to the anodes 46 and 46' through a load impedance comprising the space current path of vacuum tubes 57 and 57', respectively, and resistors 58 and 58' in series therewith. The anode circuit of each tube includes capacities 59 and 59' in shunt with the load impedance.

Effectively in shunt with each load impedance is the space current path of another vacuum tube 60 and 60', respectively. A separate source of operating voltage for the tube 60 is provided by the battery 61 connected between cathode 62 and anode 63 through the load impedance of vacuum tube 48 comprising the resistor 58 and vacuum tube 57. The connection for the tube 60' is similar to the one aforementioned. The conductivity of the tube 60 may be varied by varying the bias on the grid electrode 64 which is connected to the rider of the potentiometer 65 shunting the grid-bias source in the form of battery 66. The grid 64' of tube 60' is similarly connected to battery 66' and potentiometer 65'.

Particular attention should be paid to the vacuum tubes 57 and 57' which are part of the plate circuit of the amplifier tubes 48 and 48', respectively. For reasons which will be explained later, these tubes are preferably of the filament type with means to vary the filament heating temperature. The heating current is obtained from the battery 67 through a variable filament resistor 68 whereby the current through the filament 48 may be varied. The grids 69 and 69', respectively, of these tubes are biased by means of batteries 70 and 70', respectively. The junction point between the load resistor 58 and the filament 47 of tube 48 is connected by means of conductor 71 to a suitable indicating device shown here in the form of a vacuum tube voltmeter. Similarly the junction point of the load resistor 58' and filament 47' of the load impedance of the tube 48' is brought out to the indicating device through conductor 71'. A storage capacitor 72 is connected between conductors 71 and 71'.

The vacuum tube 73 is energized by the voltage appearing across the condenser 72 in that conductor 71 connects to the grid 74 and conductor 71' to the cathode 75 thereof through potentiometer 76 which acts as a variable voltage source being in shunt with battery 77. This voltage is utilized for biasing the grid 74 through a desired point of plate current conductivity in accordance with the adjustment of the meter reading. The plate 78 of tube 73 is connected in series with plate load resistor 79 and plate current meter 80 to the plate voltage source battery 81.

In starting the operation of the entire system, the function of the first amplifier tube 18 is to receive the impulses generated by the collector electrodes 13 and 14. These electrodes are at a high potential difference with respect to each other due to the battery 21 in the circuit. This potential is so chosen as to be very near the breaking point between the electrodes which are surrounded by an inert gas which is held in the glass container 12. An electron reaching the electrode 14 will cause ionization and thereby conduction through the gas molecules between the two electrodes. As soon as this takes place, a current flow is initiated in the resistor 19 and the static potential of the grid 17 changed. A change in grid voltage, of course, causes a change in plate current of the tube which flows to the resistor 20. In the circuit shown, a negative pulse will be transmitted through the condenser 27 to the grid 29 of the succeeding tube 28. The circuit associated with tubes 28 and 36 has the function to give a square wave-shaped output current in limiting the magnitude of the pulse to a value equal irrespective of the strength of the received pulse. This is obtained by the back coupling of the tube 36 output on the grid 29 of the tube 28. In other words, the circuit acts as a multi-vibrator triggered by the incoming pulses. The result thereof is that a uniform output is obtained and a uniform duration of pulses maintained. It must be borne in mind that the operation of the circuit does not depend on the magnitude of the impulses but upon the rate at which impulses arrive within a given time. Following the transformer circuit is the conversion network, the function of which is to build up direct current potential, the value of which is in proportion with the rate of the received impulses and to combine the two channels through which impulses are received in such manner that the difference in the impulse rate between the two channels shall be indicated. As has been stated before, the one channel through which impulses arrive is by penetration of beta rays through the material through which the thickness is to be measured, whereas the other channel acts as a standard of comparison indicating the penetration of beta rays through a known medium of given thickness. The transmission channel comprising the amplifier tube 18 and the pulse forming tubes 28 and 36 may be utilized for the radiation which penetrates the material to be measured, whereas the other channel having identical component elements including tubes 18', 28' and 36' may be utilized for the radiation penetrating the standard material 9. When the rate of absorption of the beta-particles is the same by the stand 9 and the material 1, then provided both are the same material, their thickness must be alike. It is, of course, not necessary that the standard be of the same material as long as we know the coefficient of absorption thereof with respect to the material to be measured, and this coefficient used in the computation when the difference of the pulse rate is indicated.

In the light of the above, it can be seen that the conversion circuit must actually indicate the difference in the pulse rate transmitted by the two channels. In order to do this conveniently, it is necessary that the rate of impulses should be transformed into potential variations and the difference of the potentials measured. This is obtained by providing a tank circuit of a suitable time constant in the output of each tube 48 and 48'. For the purpose of simplifying the description, the operation of one circuit following the tube 48, for example, may be considered, since the circuit of tube 48' is exactly the same as far as circuit constants and operation is concerned. Consequently, in referring to the circuit elements those will be mentioned which are associated with tube 48.

The tank circuit of the tube 48 has a suitable time constant by the resistance-capacity combination provided by the condenser 59 effectively in shunt with the grid resistor 58. The latter is not the only resistor in the plate circuit. The effective plate resistance is actually the ohmic value of the resistor 58 and the plate resistance of the variable impedance tube 57. The latter has a very important function in that it modifies the variation of plate current at a logarithmic rate. In this manner the voltage drop across the plate resistance is a result of logarithmic variation of plate current. In order that the tube 57 should perform such a function, it was found that the emission characteristic of the filament is of great importance. For this reason the filament current of these tubes is shown to be adjustable. By a proper setting of this adjustment it was found that these tubes acting as a variable load resistance will have a logarithmic conductivity characteristic.

The function of the tube 60 is simply a voltage control device which impresses a voltage across the load impedance of the tube 48 in opposite direction in such manner as to cancel out any current in the load resistance due to the static plate current of the tube 48 or due to spurious impulses received from radiations other than the beta rays obtained from the source. Spurious radiations, of course, have a much lower impulse rate than the large amount of radiation which is obtained from the radio active material used in connection with the measuring operation. By adjusting the potentiometer 65 the conductivity of the tube 60 may be varied so that any plate current of the tube 48 may be balanced out at zero input to the amplifier. The operation of the circuit associated with tube 48' is the same and the above description may be applied thereto.

The rate of current impulses reaching the grids 51 and 51' will be amplified by the tubes 48 and 48', respectively, and ultimately as the condensers 59 and 59' are charged up a potential difference will appear across each control tube 57 and 57', respectively. The two potentials are combined to energize a vacuum tube voltmeter comprising tube 73 and its associated circuit elements. The potentiometer 76 is for the purpose of balancing the bias potential on the grid 74 of the tube 73, whereby a desired plate current indication of the meter can be obtained prior to measuring operations. The meter in this case may have a zero point at a desired portion on the scale and the potential difference appearing across the condenser 72 may cause either a lowering or an increase of plate current of the vacuum tube 73 giving an indication on one side or the other side from the zero point. The meter scale may easily be calibrated to indicate, instead of plate current values, magnitudes denoting thickness of the material. Any variation of thickness will cause an indication in one or the other direction which may be so correlated with the change of the plate current in the vacuum tube 73 as to show in one direction an increase in the thickness of the material and in the other direction a decrease with respect to the standard 9.

The circuit arrangement herein described is very effective and extremely sensitive in operation allowing an accurate indication of small variations of thickness and a direct indication of ratios in that logarithmic values of voltage variations are subtracted in the differentially combined load circuits of the conversion network following the output of tubes 48 and 48'.

It is to be understood, however, that this circuit is shown merely by way of example as being the preferred arrangement for the measuring method herein employed. Other circuits capable of responding to the presence of beta-particles may be used, such as ionization chambers coupled to suitable amplifying systems.

It is not essential in order to obtain an indication of thickness directly on a meter to utilize a conversion circuit. An indicating device may be connected, such as a vacuum tube voltmeter, to the output of tube 28 in which case the second channel utilized as a control means for comparing the relative absorption between the two substances may be omitted. In the latter case, however, it is necessary that the absorption properties with respect to the thickness of the material be known, and that there shall be no change in the intensity of the rays emanating from the radio active substance. Otherwise there will be no accuracy in the reading. In certain cases where speed of operation is not very essential and accuracy need not be too great, this type of operation may be used. It will be necessary, however, to ascertain the decay in the radio active substance with a certain given time and correction must be made accordingly in the reading of the scale.

We claim as our invention:

1. The method of measuring the thickness of sheet stock in a rolling mill during rolling operation which comprises subjecting said sheet stock to the bombardment of beta-particles emanating from radio-active material relatively weak in radiations of electromagnetic character at a point where thickness is to be measured, collecting the unabsorbed beta-particles leaving said sheet stock at the point of penetration, initiating current impulses by the presence of said collected particles, converting the effect of the rate of flow of said current into proportional magnitudes of unidirectional potentials; simultaneously collecting beta-particles emanating from said source independently of said stock, initiating current impulses by the presence of said last mentioned beta-particles, converting the effect of the rate of flow of said current into proportional magnitudes of unidirectional potentials, differentially combining said two potentials and indicating said difference in scalar values denoting thickness of said sheet stock.

2. The method of measuring the thickness of sheet stock in a rolling mill during rolling operation which comprises subjecting said sheet stock to the bombardment of beta-particles emanating from radio-active material substantially free from other radiations of electromagnetic character at a point where thickness is to be measured, collecting the unabsorbed beta-particles leaving said sheet stock at the point of penetration, initiating current impulses by the presence of said collected particles, converting the effect of the rate of flow of said current into magnitudes of unidirectional potentials proportional to the logarithm of said rate of flow of current; simultaneously collecting beta-particles emanating from said source independently of said stock, initiating current impulses by the presence of said last mentioned beta-particles, converting the effect of the rate of flow of said current into magnitudes of unidirectional potentials proportional to the logarithm of said rate of flow of current, differentially combining said two potentials and indicating said difference in scalar values denoting thickness of said sheet stock.

3. In an apparatus for measuring the thickness of sheet stock in a rolling mill during rolling operation, a source of particles free from radiations of electromagnetic character, means for causing the particles from said source to bombard said sheet stock at a point where thickness is to be measured, means for collecting particles penetrating said sheet stock, means for deriving current impulses by the presence of said particles, an amplifier for said impulses, circuit means included in said amplifier for converting said impulses into electric impulses of uniform amplitude and duration, an output circuit for said amplifier including circuit means for converting said impulses into voltage variations proportional to the rate of flow of current initiated by said impulses, an indicating device responsive to voltage variations connected to said output circuit, said indicating device being calibrated in scalar values denoting thickness of said sheet stock to be measured.

4. In an apparatus for measuring the thickness of a sheet stock in a rolling mill during rolling operation, a source of beta particles emanating from radio active material substantially free from radiations of electromagnetic character, means for diverting radiation of beta particles from said material in two concentrated beams, one of said beams being directed to penetrate said sheet stock transversely as to its thickness, and the other of said beams directed upon a collector for said particles in such manner that the response of said collector constitutes a standard of comparison, another collector for said particles penetrating said sheet stock, said collectors including means for initiating current impulses by the presence of beta particles, individual amplifying means connected to each of said collectors and energized by said current impulses, an impulse transmission network connected to each of said amplifiers including vacuum tubes retroactively intercoupled for limiting the magnitude and duration of said impulses, a conversion circuit having dual transmission paths coupled to said networks, each of said paths including an amplifier energized by one of said networks, a circuit means connected to said amplifier for converting said impulses into voltage variations proportional to the rate of flow of current initiated by said impulses, a common output circuit differentially combining said amplifiers, and means responsive to unidirectional voltage changes connected to said output circuit, said means including an indicator calibrated in scalar values denoting thickness of said sheet stock to be measured.

5. In an apparatus for measuring the thickness of a sheet stock in a rolling mill during rolling operation, a source of beta particles emanating from radio active material substantially free from radiations of electromagnetic character, means for diverting radiation of beta particles from said material in two concentrated beams, one of said beams being directed to penetrate said sheet stock transversely as to its thickness, and the other of said beams directed upon a collector for said particles in such manner that the response of said collector constitutes a standard of comparison, another collector for said particles penetrating said sheet stock, said collectors including means for initiating current impulses by the presence of beta-particles, individual amplifying means connected to each of said collectors and energized by said current impulses, an impulse transmission network connected to each of said amplifiers including vacuum tubes retroactively intercoupled for limiting the magnitude and duration of said impulses, a conversion circuit having dual transmission paths coupled to said networks, each of said paths including an amplifier energized by one of said networks, a circuit means connected to said amplifier for converting said impulses into voltage variations proportional to the logarithm of the rate of flow of current initiated by said impulses, a common output circuit differentially combining said amplifiers, and means responsive to unidirectional voltage changes due to the difference of the logarithmic outputs of said amplifiers connected to said output circuit, said means including an indicator calibrated in scalar values denoting thickness of said sheet stock to be measured.

6. Apparatus in accordance with claim 3, in which the source of particles comprises radio active phosphorus.

7. Apparatus in accordance with claim 4, in which the source of beta particles comprises radio active phosphorus.

8. Apparatus in accordance with claim 5, in which the source of beta particles comprises radio active phosphorus.

9. Apparatus in accordance with claim 3, in which the output circuit of each of said amplifiers of the conversion circuit includes a variable impedance and a shunt circuit for said impedance, said variable impedance comprising an electron discharge device effecting logarithmic variation of current flow in said output circuit.

10. Apparatus in accordance with claim 4, in which the output circuit of each of said amplifiers of the conversion circuit includes a variable impedance and a shunt circuit for said impedance, said variable impedance comprising an electron discharge device effecting logarithmic variation of current flow in said output circuit.

11. Apparatus in accordance with claim 5, in which the output circuit of each of said amplifiers of the converaior circuit includes a variable impedance and a shunt circuit for said impedance, said variable impedance comprising an electron discharge device effecting logarithmic variation of current flow in said output circuit.

WILLIAM E. SHOUPP.
LEONID M. TICHVINSKY.